(12) United States Patent
Shigezane et al.

(10) Patent No.: US 9,615,436 B2
(45) Date of Patent: Apr. 4, 2017

(54) LIGHTING SYSTEM

(71) Applicant: Yazaki Corporation, Tokyo (JP)

(72) Inventors: Yasuyuki Shigezane, Susuno (JP); Shuuji Satake, Susono (JP); Terumitsu Sugimoto, Makinohara (JP); Hiroko Aono, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 15/014,587

(22) Filed: Feb. 3, 2016

(65) Prior Publication Data

US 2016/0157327 A1 Jun. 2, 2016

Related U.S. Application Data

(63) Continuation of application No. PCT/JP2014/072239, filed on Aug. 26, 2014.

(30) Foreign Application Priority Data

Aug. 29, 2013 (JP) .................................. 2013-177544

(51) Int. Cl.
H05B 37/02 (2006.01)
H05B 33/08 (2006.01)

(52) U.S. Cl.
CPC ....... *H05B 37/0281* (2013.01); *H05B 33/086* (2013.01); *Y02B 20/42* (2013.01)

(58) Field of Classification Search
CPC combination set(s) only.
See application file for complete search history.

(56) References Cited

FOREIGN PATENT DOCUMENTS

| JP | 3405625 B2 | 5/2003 |
| JP | 3149477 U | 3/2009 |
| JP | 2011-048955 A | 3/2011 |
| JP | 2011-222470 A | 11/2011 |

OTHER PUBLICATIONS

International Search Report mailed Oct. 28, 2014, issued for PCT/JP2014/072239.

*Primary Examiner* — Douglas W Owens
*Assistant Examiner* — Jianzi Chen
(74) *Attorney, Agent, or Firm* — Locke Lord LLP

(57) ABSTRACT

A lighting system which can obtain a relaxing effect of the fluctuation of color and brightness regardless of the appearance thereof is provided. The lighting system has a light source emitting illumination light, a memory section storing a lighting signal indicating the illumination light, a reading section reading the lighting signal from the memory section, and a control section controlling the light source based on the lighting signal read by the memory section. The lighting signal is a signal representing at least one of fluctuation of color and brightness in the illumination light by using synthetic waves in which a plurality of waves having different frequencies are synthesized.

2 Claims, 4 Drawing Sheets

LIGHTING SYSTEM

TECHNICAL FIELD

The present invention relates to a lighting system for performing an illumination that color or brightness is fluctuated like candle flame by using an electrical light source.

BACKGROUND ART

For example, a flicker of color or brightness in the candle flame is so-called 1/f flicker. Illumination of which color or brightness flickers has a relaxing effect on the mind and body of persons looking at the lighting. Conventionally, a lighting system for performing such illumination by using an electrical light source has proposed (for example, see Patent Literature 1). In a lighting system described in the Patent Literature 1, a reproduction of the illumination by candle flame is performed by using a light source such as an incandescent lamp or LED.

CITATION LIST

Patent Literatures

Patent Literature 1: JP 3405625 B

SUMMARY OF INVENTION

Technical Problem

In the above lighting system, for example, while actual flicker such as a flicker of brightness in the candle flame is reproduced, sometimes interruption or color jump occurs in the lighting. When an appearance of the lighting system is formed by imitating a shape of actual lighting equipment such as a candle, lamp, and lantern and so on, fluctuations including interruption of illumination and color jump give a natural impression to a person who has seen it, and an expected relaxing effect is obtained in many cases. On the other hand, for example it may not be possible to adopt such an appearance from the limitation of installation location. In this case, when interruption and color jump occurs in the lighting, it is possible to not lead to a relaxing effect since a person takes it as the failure of the lighting device.

Thus, the present invention is to provide a light system which is able to obtain a relaxing effect by the flicker of color or brightness regardless of the appearance.

Solution to Problem

To achieve the object, a lighting system according to the present invention has a light source emitting illumination light; a memory section storing a lighting signal indicating the illumination light; a reading section reading the lighting signal from the memory section; and a control section controlling the light source based on the lighting signal read by the reading section. The lighting signal is a signal representing a fluctuation of at least one of a color and brightness in the illumination light by using a synthetic wave in which a plurality of waves having different frequencies are synthesized.

In the lighting system of the present invention, the synthetic wave is synthesized by weighting differently each wave.

In the lighting system of the present invention, the weight becomes heavier as the frequency becomes lower.

In the lighting system of the present invention, the lighting signal indicates the illumination light by a plurality of coordinate parameters in a predetermined color coordinate notation system, and the synthetic wave is set for each of the plurality of the coordinate parameters, and each coordinate parameter is changed according to the synthetic wave.

Advantageous Effects of Invention

According to the present invention, at least one of the color and brightness in the illumination light emitted from the light source is fluctuated according to the synthetic wave. The waveform of the synthetic wave obtained by combining the wave is continued. For this reason, even if at least one of the color and brightness in the illumination light is fluctuated based on the synthetic wave, illumination interruption and color jump are avoided. Moreover, it is possible to prevent occurrence of situation that fluctuation of the brightness of the illumination light is interpreted as failure of the lighting system. In other words, according to the lighting system of the present invention, regardless of the appearance thereof, a relaxing effect of the fluctuation of the brightness of the illumination light can be obtained.

According to the present invention, since the synthetic wave is synthetized by weighting, the synthetic wave including complex waveform is formed. Thereby, the monotony of the fluctuation of the color and brightness can be prevented, and a higher relaxing effect can be obtained.

According to the present invention, since the weight becomes heavier as the frequency becomes lower, slowly fluctuation is emphasized, and the synthetic wave representing close to 1/f fluctuation is formed. Therefore, a relaxing effect is more increased.

According to the present invention, since the synthetic wave is set for each of the plurality of the coordinate parameters in a predetermined color coordinate notation system, and each coordinate parameter is changed according to the synthetic wave, illumination light in which the color and brightness is complexly fluctuated can be obtained. Also, the color coordinate notation system includes RGB color coordinate notation system, HSV color coordinate notation system, Lab color coordinate notation system, XYZ color coordinate notation system and so on, and those notation systems may be adopted.

DESCRIPTION OF EMBODIMENTS

First Embodiment

Figure 1:
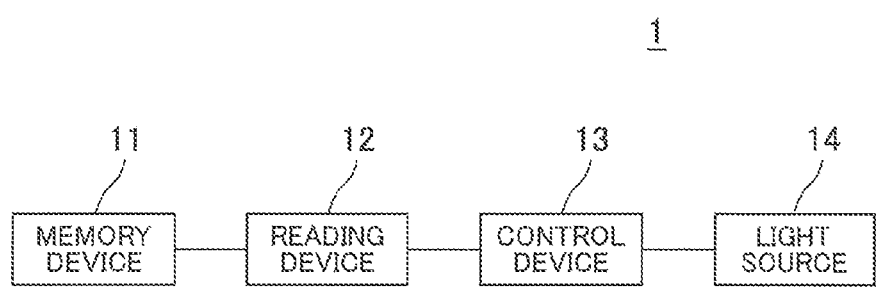
FIG. 1 is a block diagram showing a lighting device according to first embodiment in the present invention.

A lighting device according to first embodiment of the present invention will be explained with reference to FIGS. 1 and 2. FIG. 1 is a block diagram illustrating the lighting device according to the first embodiment of the present invention. Further, FIG. 2 shows synthetic waves used in the lighting device of first embodiment.

The lighting device 1 shown in FIG. 1 performs ON/OFF control of lighting with a microcomputer, and for example is used for interior illumination of a home, vehicle interior lighting and soon. The lighting device 1 includes a memory device 11, a reading device 12, a control device 13 and a light source 14. In the memory device 11, a memory constructing the microcomputer assumes the role thereof, and stores various control data. In the reading device 12, a I/O peripheral constructing the microcomputer assumes the role thereof, reads control data from the memory device 12, and transmits it to the control device 13. In the control device 13, a microprocessor constructing the microcomputer assumes the role thereof, and performs ON/OFF control of the light source 14 based on the control data transmitted from reading device 12. The light source 14 is a LED light source emitting a monochromatic light of a warm color in the embodiment of the present invention. ON/OFF, brightness of the illumination light and so on are controlled by the control device 13. Also, the lighting device 1 of the present invention has an operating section (not shown) operated by a user. The control device 13 performs ON/OFF control for the light source 14 depending on the operation to the operation section. The memory device 11 corresponds to one example of the memory section in the present invention, the reading device 12 corresponds to one example of the reading section in the present invention, the control device 13 corresponds to one example of the control section in the present invention, and the light source 14 corresponds to one example of the light source.

Here, in the embodiment of the present invention, a lighting signal which represents the illumination light that brightness flickers is stored in the memory device 11. Further, the lighting signal becomes a signal representing based on the synthetic wave generated as below.

Figure 2:
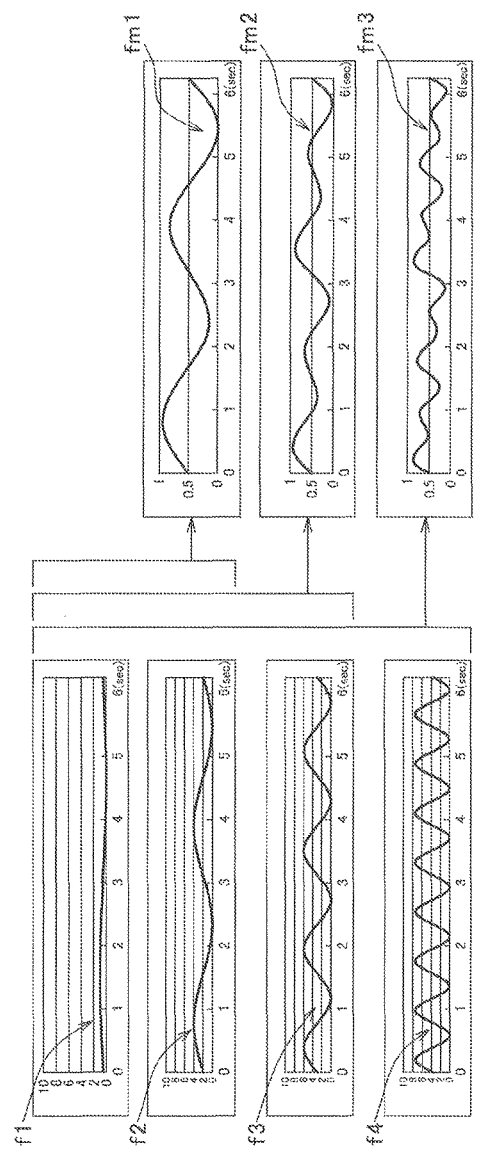
FIG. 2 shows synthetic waves used in the lighting device of first embodiment.

One example of the synthetic wave is graphically displayed in FIG. 2, and is obtained by the synthesis of four types of sine waves f1-f4. A frequency of each of those four types of the sine waves f1-f4 is equal to or lower than 10 Hz, and the size thereof is normalized in the range of 0-10. In FIG. 2, three types of synthetic waves fm1-fm3 which each wave shape is respectively different are shown as synthetic waves obtained from the synthesis of the four types of the sine waves f1-f4. Each of the four types of the sine waves f1-f4 corresponds to one example of wave in the present invention, and each of the three types of the synthetic waves fm1-fm3 corresponds to one example of synthetic wave in the present invention.

The first synthetic wave fm1 is obtained by combining the first sine wave f1 which includes the most low-frequency in the four types of sine waves f1-f4 and the second sine wave f2 which includes the second lowest frequency. The second synthetic wave fm2 is obtained by combining three sine waves, that is, the first sine wave f1, the second sine wave f2, and the third sine wave f3 which includes the third lowest frequency. Further, the third synthetic wave fm3 is obtained by combining all the four types of the sine waves f1-f4. Furthermore, each the synthetic wave is normalized in the range of from 0 to 1.0. In addition, a cycle of the first sine wave f1 is a little over 6 seconds. So, a cycle of each the synthetic wave is a little over 6 seconds. Further, each the synthetic wave is a wave connecting the stating end thereof to the terminal end thereof.

The first synthetic wave fm1 has the most slowly fluctuation in the three types of the synthetic waves fm1-fm3, and regularity of change is high. The second synthetic wave fm2 has fluctuation faster than the first synthetic wave fm1, and regularity of change is low. The third synthetic wave fm3 has the fastest fluctuation in the three types of the synthetic waves fm1-fm3, and regularity of change is the lowest.

The lighting signal is not identified here, however the lighting signal stored in the memory device 11 is a signal representing the fluctuation of brightness of the illumination light by one synthetic wave of the three types of the synthetic waves fm1-fm3.

Also, a plurality of types of the lighting signal responding to each of various synthetic waves such as the above three types of the synthetic waves fm1-fm3 may be stored in the memory device 11, and the reading device 12 may read one of the lighting signal in such a manner that one of lighting signals can be switched. This switching is performed for example depended on a switching operation from a user through an operation section not shown.

In the embodiment of the present invention, the lighting signal of only time duration in a little over 6 seconds corresponding to one cycle of the synthetic wave is stored in the memory device 11. The reading device 12 reads the lighting signal of a little over 6 seconds, and transmits it to the control device 13. At this time, as described above, since the synthetic wave is a wave connecting the staring end to the terminal end, the lighting single is also a signal connecting the starting end to the terminal end. For this reason, the lighting signal read in a repetitive manner is transmitted to the control device 13 in a state connected smoothly. The control device 13 emits the light source 14 based on the connected lighting signal. As a result, the light source 14 continues to emit the illumination light of warm color that brightness flickers like candle flame according to the lighting signal.

The wave shape of the synthetic wave obtained by combining the sine waves is continued. Therefore, even if the brightness of the illumination light fluctuates according to the synthetic wave, illumination interruption is avoided. Furthermore, it is possible to prevent occurrence of situation that fluctuation of the brightness of the illumination light is interpreted as failure of the lighting device 1. In other words, according to the lighting device 1 of the present invention, regardless of the appearance thereof, a relaxing effect of the fluctuation of the brightness of the illumination light can be obtained.

Also, according to the lighting device 1 of the present invention, the lighting signal stored in the memory device 1 is limited to a little over 6 seconds corresponding to one cycle. Therefore, a capacity required in a memory of the lighting signal can be saved in the memory device 1.

In general, a conventional microcomputer-controlled LED control system has a margin in memory capacity for data storage in many cases. The lighting device 1 of the present invention is constructed using a margin in the existing LED control system. For this reason, to save the capacity required in the memory of the lighting signal in the memory device 1 as above have an advantage in that a memory expansion is not required or is reduced in the construction of the lighting device 1.

Further, according to the lighting device 1 of the present invention, as mentioned above, since the lighting signal repeatedly read is smoothly connected each other, the fluctuation of illumination light is more natural, and it is possible to obtain a higher relaxing effect.

Moreover, according to the lighting device 1 of the present invention, the wave shapes of the four types of the sine waves f1-f4 used to generate the synthetic wave is a wave shape that frequency changes relatively slowly with 10 Hz or less. As a result, the obtained synthetic waves represent slowly fluctuation, and thereby a relaxing effect is more increased.

Furthermore, according to the lighting device 1 of the present invention, since the cycle of the synthetic wave is a little over 6 seconds as described above, it has a relatively long cycle. As a result, a viewer is hard to feel the regularity, fluctuation of the illumination light is natural, and thereby it is possible to obtain a high relaxing effect. Also, by using the sine wave over 10 seconds in the cycle for synthetic, the period of the synthetic wave may be at least 10 seconds, and a viewer may be hardly to feel the regularity.

Second Embodiment

Figure 3:
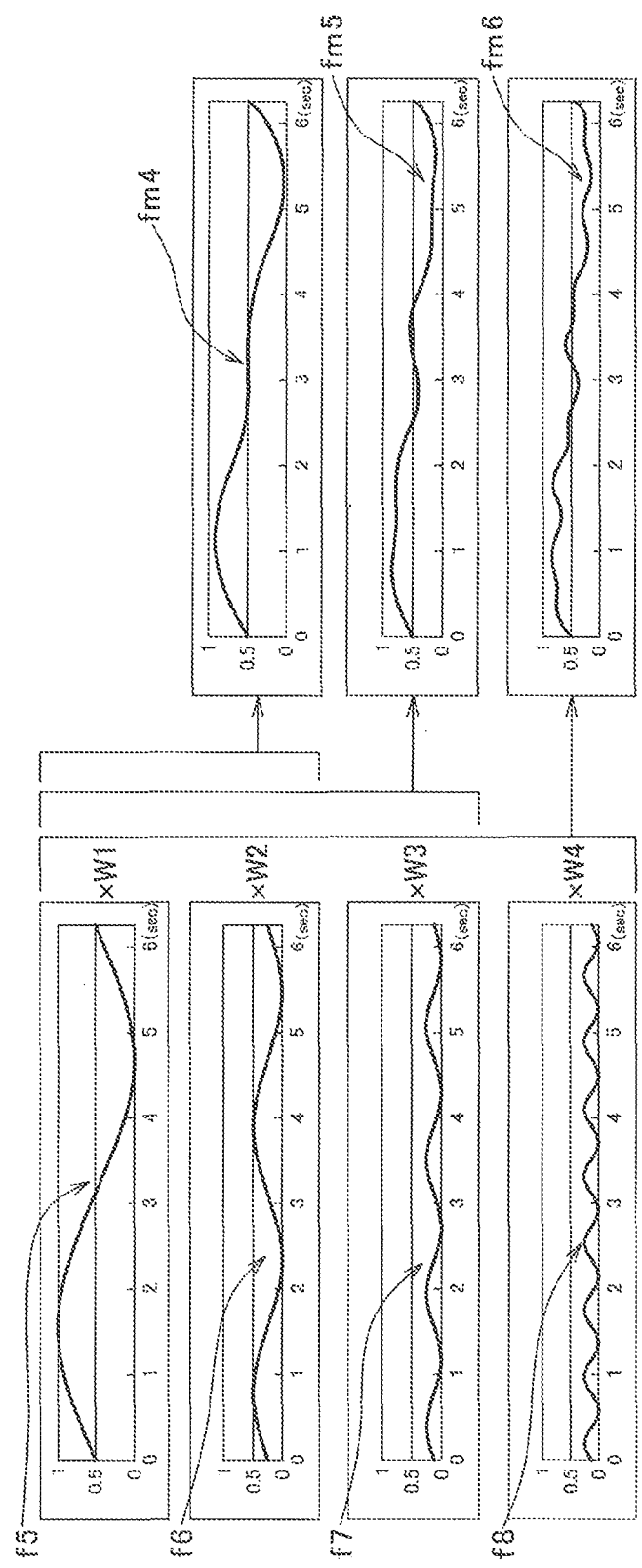
FIG. 3 shows synthetic waves used in the lighting device of second embodiment.

Next, the lighting device according to second embodiment of the present invention will be explained with reference to FIG. 3. The second embodiment has a different synthesis process and synthetic wave from the above first embodiment. FIG. 3 shows the synthetic wave used for the lighting device of the second embodiment. Meanwhile, in the lighting device of the second embodiment, the block configuration thereof is equivalent to the block configuration of the lighting device 1 of the first embodiment shown in FIG. 1. The following will be mainly explained about the synthesis process and the synthetic wave, which are the difference between the first embodiment and the second embodiment, in the lighting device of the second embodiment with reference to FIG. 3 and a block diagram shown in FIG. 1.

In the second embodiment, the synthesis of the four types of the sine waves f5-f8 of which the size are normalized in the range of 0-1.0 is performed by weighting a different weight to each sine wave. A frequency of the fifth sine wave f5 is the same as the frequency of the first sine wave f1 in the first embodiment, and a frequency of the sixth sine wave f6 is the same as the frequency of the second sine wave f2. Further, a frequency of the seventh sine wave f7 is the same as the frequency of the third sine wave f3 in the first embodiment, and a frequency of the eighth sine wave f8 is the same as the frequency of the fourth sine wave f4. Furthermore, each of the four types of the sine waves f5-f8 corresponds to one example of wave in the present invention.

Also, in the weighting, first weight W1 is multiplied in the fifth sine wave f5, second weight W2 is multiplied in the sixth sine wave f6, third weight W3 is multiplied in the seventh sine wave f7, and fourth weight W4 is multiplied in the eighth sine wave f8. Those four types of the weights W1-W4 become heavier as the frequency of the corresponding sine wave is lower. In FIG. 3, three types of the synthetic waves fm4-fm6 which are synthesized by weighting the above and the wave shape are different from each other are shown. In the fourth synthetic wave fm4, the fifth sine wave f5 in which the first weight W1 is multiplied and the six sine wave f6 in which the second weight W2 is multiplied are combined. In the fifth synthetic wave fm5, the fifth sine wave f5 in which the first weight W1 is multiplied, the six sine wave f6 in which the second weight W2 is multiplied, and the seventh sine wave f7 in which the third weight W3 is multiplied are combined. In the six synthetic wave fm6, the fifth sine wave f5 in which the first weight W1 is multiplied, the six sine wave f6 in which the second weight W2 is multiplied, the seventh sine wave f7 in which the third weight W3 is multiplied, and the eighth sine wave f8 in which the fourth weight W4 is multiplied are combined. In the three types of the synthetic waves fm4-fm6 shown in FIG. 3, the size thereof is normalized in the range of from 0 to 1.0. Furthermore, the three types of the synthetic waves fm4-fm6 correspond to one example of the synthetic wave in the present invention. Moreover, each of the four weights W1-W4 corresponds to one example of weight in the present invention.

The lighting signal stored in the memory device 11 of the present invention is a signal representing the fluctuation of brightness of the illumination light from one synthetic wave of the three types of the synthetic waves fm4-fm6 combined by the above weighting. Further, the above four types weights are set to the synthetic waves, namely a value such as the starting end of the lighting signal is connected to the terminal end thereof.

According to the lighting device of the second embodiment mentioned above, illumination interruption is also avoided, and it is possible to prevent occurrence of situation that fluctuation of the brightness of the illumination light is interpreted as failure. In other words, a relaxing effect of the fluctuation of the brightness of the illumination light can be obtained regardless of the appearance thereof in the lighting device of the second embodiment.

Furthermore, in the lighting device of the second embodiment, the synthetic wave including complex waveform is formed by weighting when combining the sine wave. Thereby, the monotony of the fluctuation of the brightness can be prevented, and a higher relaxing effect can be obtained. Moreover, in the lighting device of the second embodiment, the weight is larger as the frequency is lower. For this reason, slowly fluctuation is emphasized. In addition, since the synthetic wave representing close to 1/f fluctuation is formed, a relaxing effect is more increased.

Third Embodiment

Figure 4:
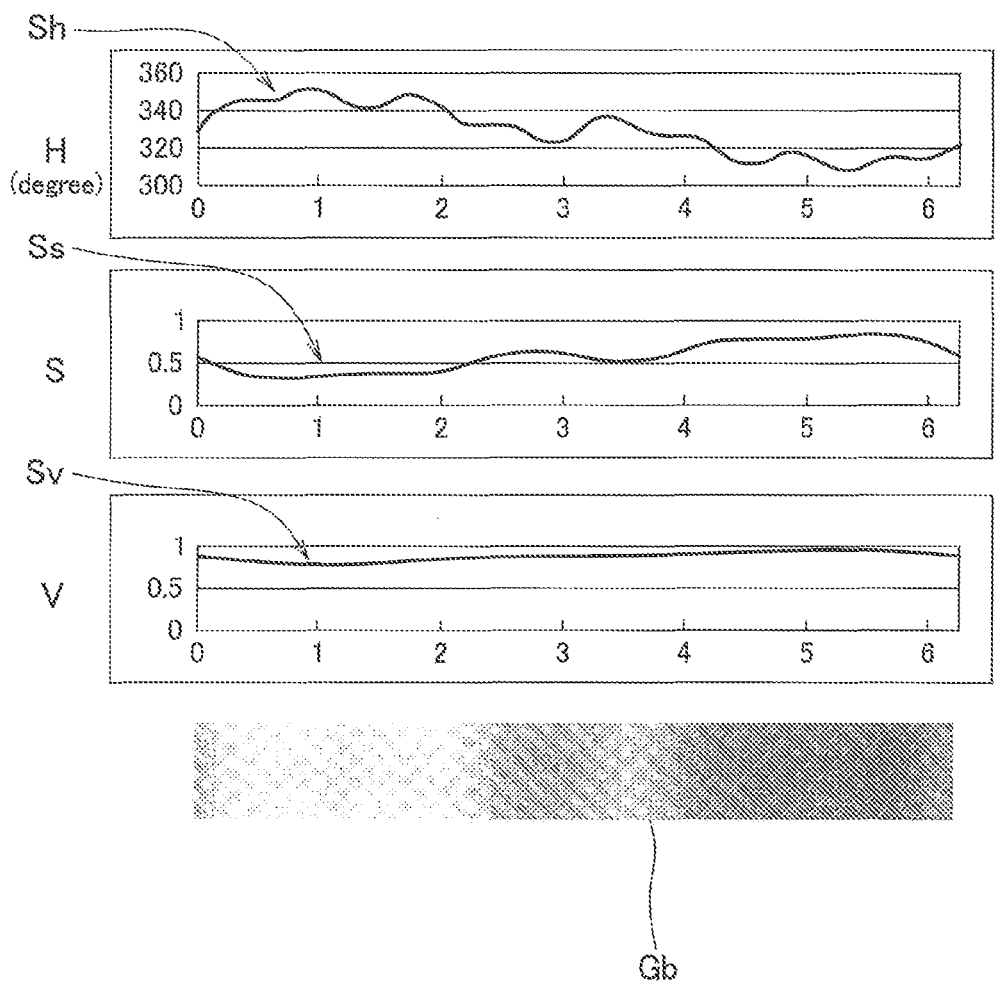
FIG. 4 shows an illumination signal generated by the lighting device of third embodiment and consisting of H (Hue angle) signal, S (Saturation) signal, and V (Value) signal.

Next, the lighting device according to third embodiment of the present invention will be explained with reference to FIG. 4. In lighting device of the third embodiment, the brightness of illumination light is fluctuated as well as color thereof. Also, in lighting device of the third embodiment, a lighting signal representing the illumination in which light both the color and brightness are fluctuated is composed of three coordinate parameters of H (Hue angle), S (Saturation), and V (Value) in HSV color coordinate notation system. The above synthetic wave is set to each coordinate parameter. FIG. 4 shows a H (Hue angle) signal, a S (Saturation) signal, and V (Value) signal consisting of the lighting signal generated in the lighting device of the third embodiment of the present invention. Meanwhile, as in the case in the lighting device of the second embodiment, in the lighting device of the third embodiment the block configuration thereof is equivalent to the block configuration of the lighting device 1 of the first embodiment shown in FIG. 1. Furthermore, the combined sine wave and the obtained synthetic wave are equal to the sine wave and the synthetic wave of the second embodiment shown in FIG. 3. The following will be mainly explained about the lighting signal, which is difference between the third embodiment and the first and second embodiments, in the lighting device of the third embodiment with reference to FIG. 4, a block diagram shown in FIG. 1, the sine wave and the synthetic wave shown in FIG. 3.

In the third embodiment, firstly three types of the synthetic waves fm4-fm6 shown in FIG. 3 are created by synthesis undergo a weighting similar to the second embodiment. Furthermore, by performing predetermined calculation to one synthetic wave of the three types of the synthetic waves fm4-fm6, a H signal Sh representing H (Hue angle) which changes in the range (300°-360°) corresponding to warm color is created. Moreover, by performing predetermined calculation to the other synthetic wave, a S signal Ss representing S (Saturation) which changes in the range of 0-1.0 is created. In addition, by performing predetermined calculation to another synthetic wave, a V signal Sv representing V (value) which changes in the range of 0-1.0 is created. Each of the H signal Sh, the S signal Ss, and the V signal Sv corresponds to one example of the coordinate parameter in the present invention.

Here, in an example of FIG. 4, the sixth synthetic wave fm6 which is the synthetic wave of the four sine waves f5-f8 is used in creation of the H signal Sh, and the fifth synthetic wave fm5 which is the synthetic wave of the three sine waves f5-f7 is used in the creation of the S signal Ss. Further, the fourth synthetic wave fm4 which is the synthetic wave of the two sine waves f5, f6 is used in the creation of the V signal Sv. As a result, value, namely lightness is slowly fluctuated, and the illumination light which color represented in Hue angle and Saturation is relatively quickly fluctuated is created. In FIG. 4, fluctuation of the illumination light is shown with gradation bar Gb. Also, it is possible to obtain the illumination light that brightness is relatively quickly fluctuated, and color representing with Hue angle or Saturation is slowly fluctuated opposite to the embodiments of the present invention by changing action between the three types of the synthetic waves fm4-fm6 and signals of the H signal Sh, the S signal Ss, and the V signal Sv.

According to the lighting device of the third embodiment mentioned above, illumination interruption and color skip are avoided when both color and brightness are fluctuated, and occurrence of situation that fluctuation of the brightness of the illumination light is interpreted as failure can be prevented. In other words, a relaxing effect of the fluctuation of the brightness of the illumination light can be obtained regardless of the appearance thereof in the lighting device of the third embodiment.

Moreover, according to the lighting device of the third embodiment, the illumination light is complexly fluctuated compared with the above monochromatic illumination light. Furthermore, it is possible to obtain a higher relaxing effect. Also, the color coordinate notation system includes RGB color coordinate notation system, HSV color coordinate notation system, Lab color coordinate notation system, XYZ color coordinate notation system and so on, and those notation systems may be adopted.

The illustrated embodiments of the present invention have been described for illustrative purposes only, and not by way of limiting the invention. Accordingly, the present invention can be implemented with various modifications made thereto within the scope of the present invention.

For example, in each embodiment, the sine wave is used in synthesis, but it is not limited thereto. It is possible to combine a cosine wave, or another wave such as a square wave and triangle wave.

Furthermore, for example, in each embodiment, a previously generated lighting single is stored in the memory device 11, and the lighting signal is read by the reading device 12. However, it is not limited thereto. For example, a plurality of waves before combining may be stored in the memory device 11, and those waves may be read by the reading device 12. Then, the synthesis may be performed with the control device 13, the lighting single may be created, and stored in the memory device 11.

REFERENCE SIGNS LIST 1 lighting device (one embodiment of lighting system)
11 memory device (one example of memory section)
12 reading device (one example of reading section)
13 control device (one example of control section)
14 light source (one example of light source)
f1-f8 sine wave (one example of wave)
fm1-fm6 synthetic wave (one example of synthetic wave)
W1-W4 weight (one example of weight)
Sh H (Hue angle) signal (one example of coordinate parameter)
Ss S (Saturation) signal (one example of coordinate parameter)
Sv V (Value) signal (one example of coordinate parameter)

The invention claimed is:

1. A lighting system comprising:
a light source emitting illumination light;
a memory section storing a lighting signal indicating the illumination light;
a reading section reading the lighting signal from the memory section; and
a control section controlling the light source based on the lighting signal read by the reading section,
wherein the lighting signal is a signal representing a fluctuation of at least one of a color and brightness in the illumination light by using a synthetic wave in which a plurality of waves having different frequencies are synthesized,
wherein the synthetic wave is synthesized by weighting differently each wave, and
wherein the weight becomes heavier as the frequency becomes lower.

2. The lighting system according to claim 1, wherein the lighting signal indicates the illumination light by a plurality of coordinate parameters in a predetermined color coordinate notation system, and
wherein the synthetic wave is set for each of the plurality of the coordinate parameters, and each coordinate parameter is changed according to the synthetic wave.

* * * * *